(12) United States Patent
Kaupert et al.

(10) Patent No.: US 9,987,585 B2
(45) Date of Patent: Jun. 5, 2018

(54) DRYING AGENT CARTRIDGE

(71) Applicant: MAN Truck & Bus AG, München (DE)

(72) Inventors: Oliver Kaupert, München (DE); Wolfgang Kolland, München (DE); Georg Haslberger, Reichertsheim (DE); Thomas Hofstetter, Mainburg (DE)

(73) Assignee: MAN Truck & Bus AG, München (DE)

( * ) Notice: Subject to any disclaimer, the term of this patent is extended or adjusted under 35 U.S.C. 154(b) by 103 days.

(21) Appl. No.: 15/294,219

(22) Filed: Oct. 14, 2016

(65) Prior Publication Data

US 2017/0106326 A1 Apr. 20, 2017

(30) Foreign Application Priority Data

Oct. 16, 2015 (DE) .................. 10 2015 013 487

(51) Int. Cl.
*B01D 53/02* (2006.01)
*B01D 53/04* (2006.01)
(Continued)

(52) U.S. Cl.
CPC ..... *B01D 53/0407* (2013.01); *B01D 53/0415* (2013.01); *B01D 53/261* (2013.01); *B60T 17/004* (2013.01)

(58) Field of Classification Search
CPC ........ B01D 2257/80; B01D 2259/4566; B01D 53/0415; B01D 53/261; B60T 17/002
See application file for complete search history.

(56) References Cited

U.S. PATENT DOCUMENTS 5,779,772 A  7/1998 Unger et al.
5,792,245 A  8/1998 Unger et al.
(Continued)

FOREIGN PATENT DOCUMENTS

DE  4339758 A1  5/1995
DE  10039631 A1  2/2002
(Continued)

OTHER PUBLICATIONS

Extended search report issued in corresponding application No. 16001974.1 dated Feb. 27, 2017.

*Primary Examiner* — Christopher P Jones
(74) *Attorney, Agent, or Firm* — Carter, DeLuca, Farrell & Schmidt, LLP

(57) ABSTRACT

A drying agent cartridge is provided for detachable fastening to a compressed-air treatment installation of a vehicle. A device is also provided for the detachable fastening of a drying agent cartridge to a housing of a compressed-air treatment installation of a vehicle. The drying agent cartridge include a cartridge housing which contains a drying agent, having a cover, a carrier element, a thread, which is arranged on the carrier element, and a corresponding counterpart thread, of a compressed-air treatment installation. The drying agent cartridge furthermore includes a seal groove on the carrier element underside, a sealing element in the seal groove, and a fluidic connection between the seal groove and a pressurizable chamber within the drying agent cartridge, via which fluidic connection the sealing element can be acted on, when the drying agent cartridge is in an installed position, with a system pressure of the compressed-air treatment installation.

15 Claims, 1 Drawing Sheet

(51) Int. Cl.
*B01D 53/26* (2006.01)
*B60T 17/00* (2006.01)

(56) References Cited

U.S. PATENT DOCUMENTS

| | | |
|---|---|---|
| 6,471,755 B2 | 10/2002 | Binder et al. |
| 8,795,419 B2 | 8/2014 | Niemeyer et al. |
| 2002/0035926 A1 | 3/2002 | Binder et al. |
| 2002/0189458 A1 | 12/2002 | Fornof et al. |
| 2008/0110340 A1* | 5/2008 | Hoffman ............ B01D 53/0415 95/118 |
| 2009/0199522 A1* | 8/2009 | Hilberer ................ B60T 17/004 55/385.1 |
| 2010/0236653 A1* | 9/2010 | Hilberer ................ B60T 17/004 137/870 |
| 2013/0239815 A1 | 9/2013 | Niemeyer et al. |
| 2014/0260995 A1* | 9/2014 | Adams ............... B01D 46/0039 96/400 |
| 2016/0375396 A1* | 12/2016 | Minato .............. B01D 53/0407 96/132 |

FOREIGN PATENT DOCUMENTS

| | | |
|---|---|---|
| DE | 102007034435 A1 | 1/2009 |
| DE | 102010011956 A1 | 9/2011 |
| DE | 102012105137 A1 | 12/2013 |
| DE | 102013103066 A1 | 10/2014 |
| GB | 2103954 A | 3/1983 |

* cited by examiner

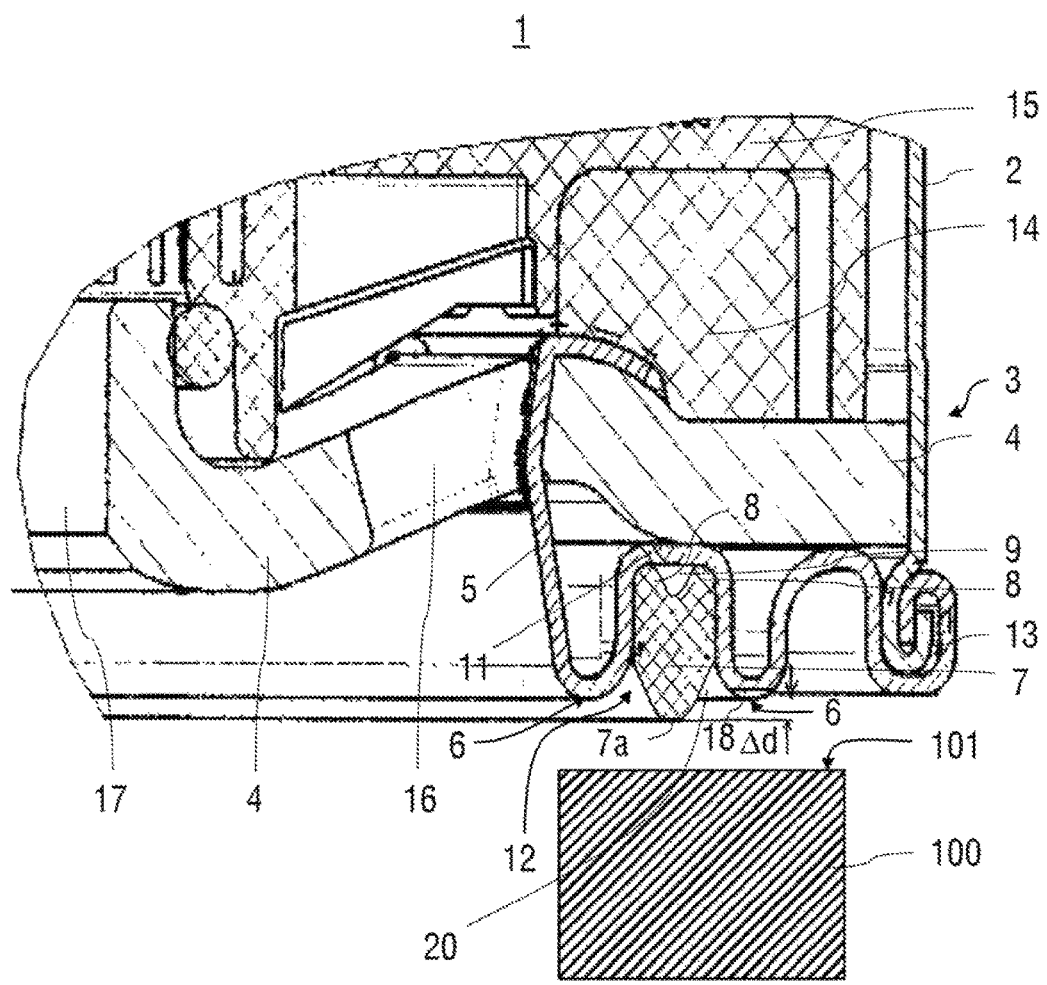

DRYING AGENT CARTRIDGE

TECHNICAL FIELD

The present disclosure relates to a drying agent cartridge for detachable fastening to a compressed-air treatment installation of a vehicle, in particular of a utility vehicle. The present disclosure also relates to a device for the detachable fastening of a drying agent cartridge to a housing of a compressed-air treatment installation of a vehicle.

BACKGROUND

Compressed-air systems, in particular in utility vehicles, require a so-called compressed-air treatment installation, hereinafter also referred to as air treatment installation, downstream of the air compressor. In such treatment installations, the air is, inter alia, dried and filtered, and oil constituents are separated out. These processes all take place in a so-called drying agent cartridge which, broadly speaking, is composed of a base panel with openings for the throughflow of the air and of a cup-shaped or pot-shaped cover, which base panel and cover are fixedly connected to one another. In the drying agent cartridge there is situated a moisture-adsorbing granulate which extracts the moisture from the air flowing through. When used in a utility vehicle, the granulate has only a limited service life. A reason for this is that the oil mist contained in the compressed air is deposited on the granulate and thus reduces the effective surface area for the absorption of moisture. Furthermore, the granulate can mechanically break down as a result of the vibration loading. The drying agent cartridge must therefore be exchanged at regular intervals.

For this purpose, the cartridge is typically equipped with a female thread in the base panel. It is thus possible for the consumed cartridge to be unscrewed from, and for a new cartridge to be screwed onto, an external thread on the housing of the compressed-air treatment installation, for example on the air dryer housing. Use is normally made of a square-section sealing ring which is compressed axially as a result of the screw connection, thus imparts a sealing action, and at the same time ensures the axial bracing action of the screw connection. Drying agent cartridges of the type are known for example from the laid-open specifications DE 10 2013 103 066 A1, DE 10 2012 105 137 A1 and DE 10 2007 034 435 A1.

Depending on the installation location of the compressed-air treatment installation, the accessibility to the cartridge for an exchange is often restricted. The cartridge is always fastened to the top of the housing of the compressed-air treatment installation, and therefore the optimum direction of access for the exchange of the cartridge would be from above. This freedom however does not always exist owing to body structures in the case of heavy goods vehicles or generally in the case of buses. Furthermore, work is often performed from below if the vehicle is standing over the workshop pit.

Nowadays, in some cases very firmly seated cartridges exist, in the case of which the predefined service times for the cartridge exchange in the workshop cannot be adhered to. A very high release moment is required, which, despite auxiliary means such as for example a clamping strap with a long lever, is difficult to apply because the lateral free space for the use of a lever does not exist.

In the case of the fastenings between cartridge base panel and housing of the compressed-air treatment unit such as are known from practice, because the sealing element, typically a square-section sealing ring, must co-rotate during the screw connection process, large fluctuations arise in the tightening moment owing to different friction influences, and damage to or twisting of the sealing element occurs, which in turn results in leakage. Furthermore, the axial bracing action of the screw connection must be generated by way of the seal.

SUMMARY

It is therefore an object of the present disclosure to provide an improved means for being able to detachably fasten a drying agent cartridge to a housing of an air treatment installation, by which means the disadvantages of conventional techniques can be avoided. In particular, it is the object of the present disclosure to provide a fastening interface for a drying agent cartridge, by way of which fastening interface the cartridge can be fastened in sealed-off fashion to a housing of the air treatment installation, for example of the air dryer, and can be safely and reliably released again with constant expenditure of force.

The objects are achieved by way of a drying agent cartridge having the features of the independent claim. Advantageous embodiments and uses of the present disclosure will emerge from the dependent claims and will be discussed in more detail in the following description, with partial reference to the figures.

The drying agent cartridge according to the present disclosure, also referred to as drying cartridge, is detachably fastenable to a compressed-air treatment installation of a vehicle, in particular of a utility vehicle, and comprises, in a manner known per se, a cartridge housing in which there is held a drying agent container. The cartridge housing has a cover, which delimits the cartridge housing in an upward direction and which is typically of cup-shaped or pot-shaped form, and a carrier element which delimits the cartridge housing in a downward direction. In the installed position, the carrier element is detachably fastened to the housing of the compressed-air treatment installation, for example to the housing of an air dryer, and is also referred to as base panel. For this purpose, the cartridge comprises a thread, which is arranged on the carrier element, for the screw connection of the drying agent cartridge to a housing, which has a corresponding counterpart thread, of the compressed-air treatment installation.

According to general aspects of the present disclosure, the drying agent cartridge, hereinafter also referred to for short as cartridge, comprises a seal groove, which is arranged on the underside of the carrier element, and a sealing element, which is arranged in the seal groove and which serves for sealing off the cartridge, in the installed state, with respect to the housing section of the air treatment installation. The drying agent cartridge furthermore comprises a fluidic connection between the seal groove and a pressurizable chamber within the drying agent cartridge, via which fluidic connection, when the drying agent cartridge is in an installed position, the sealing element can be acted on with a system pressure of the compressed-air treatment installation in order to generate and/or at least increase the axial compression of the sealing element between the carrier element and the housing section as a result of the exertion of pressure. The fluidic connection thus ends, at one end, in any chamber within the cartridge housing which is charged with compressed air from the air treatment installation during the operation of the drying agent cartridge, and, at the other end, in the seal groove such that the seal element arranged there is acted on, and forced against the housing of the air treatment installation, by the compressed air prevailing in the connecting bore.

This offers the advantage that the actual sealing action resulting from the axial compression of the sealing element is generated not, or at least not only, by way of the screw connection but primarily by way of the pneumatic exertion of pressure on the sealing element.

In other words, in the screwed-on but unpressurized state, the sealing element is acted on either with no axial force or with merely a first axial force which is lower than the final axial force generated as a result of the action of the system pressure of the air treatment installation on the sealing element via the fluidic connection, such that, when the drying agent cartridge is in the screwed-on state on the housing, in the unpressurized state, that is to say in the state in which it is not acted on with system pressure, a basic sealing action is realized, and, when the sealing element is acted on with pressure, a second sealing action is realized which is more intense than the basic sealing action. In this way, it is possible to dispense with the approach known from the prior art in which the sealing element must co-rotate during the screwing-on process, such that the undesired large fluctuations in the tightening moment as a result of different friction influences, and the resulting fluctuations in the release moment, damage to the sealing element and leakage, are avoided.

The axial direction corresponds to the direction of the screw connection axis, or of the central axis, which is perpendicular to the carrier element, of the drying agent cartridge. The installed position of the drying agent cartridge is the position in which the drying agent cartridge is screwed onto the housing of the compressed-air installation.

The seal groove is preferably a seal groove which is recessed in the cartridge base and/or in the carrier element, which seal groove is furthermore preferably formed as an encircling seal groove and/or as a ring-shaped groove around the central axis of the cartridge. The sealing element is preferably a moulded seal, more preferably a sealing ring.

In a particular embodiment, the drying agent cartridge comprises an abutment on the cartridge housing, in particular on the underside of the carrier element, which abutment, during the screwing-on of the cartridge housing, can be screwed on as far as a point of abutment against the housing of the compressed-air treatment installation, and, in the state in which screwing-on has been performed as far as a point of abutment, defines a predetermined axial end position of the seal groove. The abutment may be provided as at least one abutment surface. The abutment thus defines a predetermined spacing of the seal groove to the abutment surface of the housing of the air treatment installation, and thus the axial force that acts on the sealing element in a state in which the cartridge has been screwed as far as a point of abutment and has not yet been acted on with system pressure. Thus, in this state, the axial force acting on the sealing element is independent of the tightening torque of the screw connection.

In a particular variant of this embodiment, the abutment is arranged such that, during a screwing-on process of the drying agent cartridge as far as a point of abutment against the housing, the sealing element does not co-rotate, and is thus not twisted, or is at least only slightly twisted, during the screwing-on process.

The abutment or the abutment surface thus ensures that the drying agent cartridge can be screwed firmly against a hard abutment and, here, very constant tightening moments and correspondingly constant release moments during cartridge exchange are realized.

The abutment is a metallic, hard abutment and may be formed as a component of the drying agent cartridge, for example as a section of the carrier element, in particular of the base plate. The abutment may be arranged radially to the inside or radially to the outside of the seal groove or to both sides of the seal groove. The radial direction is perpendicular to the abovementioned axial direction.

In a further particular exemplary embodiment, the sealing element has a cross-sectional profile which generates a self-boosting sealing action and/or a self-reinforcing geometry under pressure. In an advantageous variant of this embodiment, the sealing element has, in the region of its abutment surface against the base region of the seal groove, protruding beads and a depression between the beads, which depression is arranged above an end region, which opens into the seal groove, of the fluidic connection. In the state in which it is clamped in the seal groove, the sealing ring is, when acted on with pressure, deformed such that the beads are forced with even greater intensity laterally against the edge surfaces of the ring-shaped groove and toward the upper end of the ring-shaped groove, that is to say in the direction of the housing of the air treatment installation. A self-boosting effect is thus achieved.

It is also advantageous if, in the non-installed state of the drying agent cartridge, the sealing element projects out of an edge region, facing toward the housing, of the seal groove, such that, even in the unpressurized state, a basic sealing action is realized as a result of the abutment of a corresponding sealing surface of the air treatment installation housing against the projecting-out region.

The fluidic connection may be provided for example in the form of a duct, in particular in the form of a connecting bore. Furthermore, it is advantageous if the fluidic connection opens into an encircling depression which is provided in the base of the seal groove, preferably into an encircling ring-shaped duct which is provided in the base of the seal groove formed as a ring-shaped groove. In this way, the pressure is distributed more effectively under the sealing element.

Furthermore, the drying agent cartridge may have a pressure equalization connection, for example in the form of a duct, a groove or a notch, which pressure equalization connection permits pressure equalization between a gap or region, which in the installed position is formed between the sealing element and the abutment, and the surrounding atmosphere. Alternatively, a pressure equalization connection of the type may also be provided on the corresponding housing section of the air treatment installation.

The carrier element may, in a manner known per se, have a carrier panel and a crimped plate or a crimped panel, wherein the fastening between carrier panel and cover is realized by way of the crimped plate. The carrier panel may have an inflow opening and, within the thread, a central outflow opening, wherein the thread may be in the form of a female thread in order for the carrier element to be screwed on to an external thread of a housing of the compressed-air treatment installation. The carrier element or the carrier panel may, for example for fastening to the housing section, for example to the dryer housing, be detachably held on an external thread, which extends axially centrally through the drying agent cartridge, of the housing section.

Here, the crimped plate may advantageously be utilized for forming the seal groove by way of a crimped formation of the crimped plate. Furthermore, the stop may be formed by a crimped formation of the crimped plate.

According to a further aspect of the present disclosure, a device for the detachable fastening of a drying agent cartridge to a housing of a compressed-air treatment installation of a vehicle, in particular of a utility vehicle, is provided. The device constitutes an interface for the detachable fastening of a drying agent cartridge to the housing of the compressed-air treatment installation. The device comprises a drying agent cartridge according to the present disclosure, as described in this document, a counterpart thread for the screw connection of the drying agent cartridge, which counterpart thread is arranged on the housing of the compressed-air treatment installation, and a planar sealing surface of the housing, which planar sealing surface is arranged on the housing such that, in the installed position and at least in the state in which the sealing element is acted on with system pressure, the planar sealing surface bears against the sealing element for sealing purposes.

The interface device according to the present disclosure is characterized in that, in the installed position of the drying agent cartridge and in an unpressurized first state, in which the sealing element is not acted on with a system pressure of the compressed-air treatment installation via the fluidic connection, a first axial force acts on the sealing element, and thus a first sealing action, that is to say a basic sealing action, is achieved. Furthermore, in the installed position of the drying agent cartridge and in a second state, in which the sealing element is acted on with a system pressure of the compressed-air treatment installation via the fluidic connection, a second axial force which is higher than the first axial force acts on the sealing element, and thus a second sealing action which is more intense than the basic sealing action is achieved.

The present disclosure also relates to a vehicle, in particular a utility vehicle, having a drying agent cartridge or device as described in each case in this document.

BRIEF DESCRIPTION OF THE DRAWINGS

FIG. 1 shows an enlarged sectional detail view of a drying agent cartridge, according to an exemplary embodiment of the present disclosure.

DETAILED DESCRIPTION OF THE DRAWINGS

The above-described embodiments and features of the present disclosure may be combined with one another in any desired manner. Further details and advantages of the present disclosure will be described below with reference to the appended drawing.

Here, FIG. 1 shows an enlarged sectional detail view of a drying agent cartridge according to an exemplary embodiment of the present disclosure. FIG. 1 shows, in particular, an enlarged detail of a radially outer, lower region of a drying agent cartridge 1. The internal construction of the drying agent cartridge 1 may be of a design known per se, for example as described in the laid-open specifications DE 10 2013 103 066 A1, DE 10 2012 105 137 A1 and DE 10 2007 034 435 A1. The reference designation 14 denotes, for example, the oil filter, which is formed by a nonwoven, and the reference designation 15 denotes the internal container for the drying agent, of which only a small part is visible.

The cartridge housing of the drying agent cartridge has, in a manner known per se, a pot-shaped or cup-shaped cover 2, which delimits the cartridge housing in an upward direction, and a carrier element 3, for example in the form of a base panel, which delimits the cartridge housing in a downward direction. The carrier element 2, when in an installed position on a housing section 100 of the air drier of the compressed-air treatment installation 1, is detachably held, by way of a female thread, on an external thread (not illustrated) of the housing section 100, which external thread extends axially centrally through the drying agent cartridge. The housing section of the compressed-air treatment installation, for example of an air dryer, is illustrated merely schematically. Contrary to the illustration in FIG. 1, in the installed position, the housing section extends along the entire underside of the cartridge 1, wherein, in order to illustrate the present disclosure, FIG. 1 illustrates only a subsection of the housing 100 which has a planar sealing surface 101, the planar sealing surface being arranged on the housing 100 such that, in the installed position, the planar sealing surface bears against the face surface 7a of the sealing ring 7 and thus seals off the cartridge housing with respect to the housing 100.

As is described in the laid-open specifications DE 10 2013 103 066 A1, DE 10 2012 105 137 A1 and DE 10 2007 034 435 A1, the carrier element is likewise formed from a carrier panel 4 and a crimped plate 5, wherein the fastening between carrier panel 4 and the pot-shaped outer cover 2 of the drying agent cartridge is realized by way of the crimped plate 5 by virtue of the outer cover and the crimped plate 5 being crimped together, thereby forming the cartridge seam 13. The carrier element has, within the female thread, a central outflow opening 17, via which the dried and purified air exits the drying agent cartridge. FIG. 1 also shows the air inflow opening 16 in the carrier panel 4 and the central air outflow opening 37.

The special feature of this design variant lies in the fact that a ring-shaped seal groove 12 is provided on the underside of the carrier panel 4, which seal groove is formed by a crimped formation of the crimped plate 5. A sealing ring 7 is arranged in the seal groove 12. Furthermore, a fluidic connection in the form of a connecting bore 11 is provided, which fluidic connection connects the seal groove 12 to a pressurizable chamber within the drying agent cartridge 1. Via the connecting bore 11, when the drying agent cartridge 1 is in an installed position on the housing of the air treatment installation, the sealing element 7 can be acted on with a system pressure of the compressed-air treatment installation. The fluidic connection 11 thus ends, at one end, in any chamber within the cartridge housing which is charged with compressed air from the air treatment installation during the operation of the drying agent cartridge, and, at the other end, in the seal groove 12 such that the seal element arranged there is acted on, and forced against the abutment surface 101, by the compressed air prevailing in the connecting bore 11.

The sealing ring 7 has a cross-sectional profile which generates a self-boosting sealing action and/or a self-reinforcing geometry under pressure. In the present case, this is realized in that the sealing ring 7, in the region of its abutment surface against the base region of the seal groove 12, has two protruding beads 8 and a depression 9 between the beads 8. Here, the depression is arranged over an end region, which opens into the seal groove 12, of the fluidic connection 11. In the state in which it is clamped in the ring-shaped groove 12, the sealing ring 7 is, when acted on with pressure, deformed such that the beads 8 are forced laterally against the limbs of the groove 12 and toward the open end of the groove 12, and thus press against the walls of the groove 12, with even greater intensity. A self-boosting effect is thus achieved.

Furthermore, on the underside of the cartridge 1, an abutment 6 is provided on the cartridge housing, which abutment is in the present case formed by a crimped formation of the crimped plate 5 and, during the screwing-on of the cartridge housing, can be screwed on as far as a point of abutment against the housing 100 of the compressed-air treatment installation, and then lies against the planar sealing surface 101 of the housing 100. In the state in which screwing-on has been performed as far as a point of abutment, the abutment surface formed by the abutment 6 defines a predetermined axial end position of the seal groove 12.

The ring-shaped gap formed between the sealing ring 7 and abutment 6 is connected via a notch or a further groove 18 to a region which is always at atmospheric pressure, in order to permit pressure equalization.

In the present exemplary embodiment, when the drying agent cartridge 1 is in the non-installed state, the sealing ring 7 projects, by the projecting length Δd, out of that edge region of the seal groove 12 which faces toward the housing 100, wherein Δd may lie in the range from 0.3 to 0.5 mm. In this way, in the state in which screwing-on has been performed as far as a point of abutment, the sealing ring 7 is compressed slightly in an axial direction, and is thereby axially compressed. However, the sealing ring 7 does not co-rotate during the screwing-on process, and is not twisted or is at least only slightly twisted. In the unpressurized state, the intensity of the compression in the state in which screwing-on has been performed as far as a point of abutment is substantially always constant, because the abutment defines a predetermined spacing between the tip 7*a* of the sealing ring 7 and the sealing surface 101 in the screwed-on state.

The slight axial compression of the sealing ring 7 in the state in which the cartridge 1 has been screwed on as far as a point of abutment thus generates a basic sealing action. The sealing ring 7 is consequently not fully compressed for as long as no compressed air prevails via the connecting bore 7. The actual sealing action is however generated for the first time when the sealing ring 7 is acted on with the system pressure of the air treatment installation via the connecting bore. During the operation of the air treatment installation, the drying agent cartridge 1 is acted on with a system pressure of the air treatment installation, for example a pressure of over 6 bar, via the inflow opening 16. The pressure also acts on the sealing ring 11 via the connecting bore 11. When acted on with pressure, the sealing ring 11 furthermore deforms as described above, such that an intense axial force acts on, and compresses, the sealing ring 7.

The actual sealing action is thus not generated during the screwing-on process but is generated for the first time when the sealing ring 7 is acted on with pressure. Furthermore, the abutment 6 makes it possible to realize a screwing-on process with a constant tightening moment, and correspondingly also makes it possible to realize a constant release moment during cartridge exchange. It is thus possible to ensure greater reliability during operation and greater ease of maintenance during a cartridge exchange, because the sealing element (presently typically a square-section sealing ring) does not need to co-rotate during the screwing-on process. Fluctuations in the tightening torque as a result of different friction influences are avoided. Damage to or co-rotation of the sealing element can likewise be avoided or at least significantly reduced, because the sealing element is fixed with respect to the housing and is not fully compressed for as long as no pressure acts.

Even though the present disclosure has been described with reference to particular exemplary embodiments, it is evident to a person skilled in the art that various changes may be made, and equivalents used as replacements, without departing from the scope of the present disclosure. Furthermore, numerous modifications may be made without departing from the associated scope. Consequently, the present disclosure is not intended to be restricted to the disclosed exemplary embodiments, but is rather intended to encompass all exemplary embodiments which fall within the scope of the appended patent claims. In particular, the present disclosure also claims protection for the subject matter and the features of the subclaims independently of the claims referred to.

The invention claimed is:

1. A drying agent cartridge for detachable fastening to a compressed-air treatment installation of a vehicle comprising:
   a cartridge housing which contains a drying agent, having a cover, which delimits the cartridge housing in an upward direction, and having a carrier element which delimits the cartridge housing in a downward direction and which, in an installed position, is detachably fastened to the housing of the compressed-air treatment installation;
   a thread, which is arranged on the carrier element, for the screw connection of the drying agent cartridge to a housing, which has a corresponding counterpart thread, of a compressed-air treatment installation;
   a seal groove which is arranged on the underside of the carrier element;
   a sealing element which is arranged in the seal groove; and
   a fluidic connection between the seal groove and a pressurizable chamber within the drying agent cartridge, via which fluidic connection the sealing element can be acted on, when the drying agent cartridge is in an installed position, with a system pressure of the compressed-air treatment installation.

2. The drying agent cartridge according to claim 1, wherein an abutment on the cartridge housing, during the screwing-on of the cartridge housing, can be screwed on as far as a point of abutment against the housing of the compressed-air treatment installation, and, in the state in which screwing-on has been performed as far as a point of abutment, defines a predetermined axial end position of the seal groove.

3. The drying agent cartridge according to claim 2, wherein the abutment is arranged such that, during a screwing-on process as far as a point of abutment of the drying agent cartridge against a housing, the sealing element does not co-rotate.

4. The drying agent cartridge according to claim 1, wherein the sealing element has a cross-sectional profile which generates a self-boosting sealing action and/or a self-reinforcing geometry under pressure.

5. The drying agent cartridge according to claim 1, wherein the sealing element has, in the region of its abutment surface against the base region of the seal groove, protruding beads and a depression between the beads, which depression is arranged above an end region, which opens into the seal groove, of the fluidic connection.

6. The drying agent cartridge according to claim 1, wherein, in the non-installed state of the drying agent cartridge, the sealing element projects out of an edge region, facing toward the housing, of the seal groove.

7. The drying agent cartridge according claim 1, wherein the fluidic connection is provided in the form of a duct.

8. The drying agent cartridge according claim 1, wherein the fluidic connection opens into an encircling depression which is provided in the base of the seal groove.

9. The drying agent cartridge according claim 8, wherein the fluidic connection opens into an encircling ring-shaped duct which is provided in the base of the seal groove formed as a ring-shaped groove.

10. The drying agent cartridge according to claim 1, wherein a pressure equalization connection in the form of a duct, a groove or notch, which pressure equalization connection permits pressure equalization between a gap, which in the installed position is formed between the sealing element and the abutment, and the surrounding atmosphere.

11. The drying agent cartridge according to claim 1, wherein
the carrier element has a carrier panel and a crimped plate, and the fastening between carrier panel and cover is realized by way of the crimped plate; and
the seal groove is formed by a crimped formation of the crimped plate.

12. The drying agent cartridge according to claim 11, wherein the abutment is formed by a crimped formation of the crimped plate.

13. A device for the detachable fastening of a drying agent cartridge to a housing of a compressed-air treatment installation of a vehicle, comprising:
a drying agent cartridge comprising:
a cartridge housing which contains a drying agent, having a cover, which delimits the cartridge housing in an upward direction, and having a carrier element which delimits the cartridge housing in a downward direction and which, in an installed position, is detachably fastened to the housing of the compressed-air treatment installation,
a thread, which is arranged on the carrier element, for the screw connection of the drying agent cartridge to a housing, which has a corresponding counterpart thread, of a compressed-air treatment installation,
a seal groove which is arranged on the underside of the carrier element;
a sealing element which is arranged in the seal groove, and
a fluidic connection between the seal groove and a pressurizable chamber within the drying agent cartridge, via which fluidic connection the sealing element can be acted on, when the drying agent cartridge is in an installed position, with a system pressure of the compressed-air treatment installation, and
a counterpart thread for the screw connection of the drying agent cartridge to the housing arranged on the housing of the compressed-air treatment installation; and
a planar sealing surface of the housing, which planar sealing surface is arranged on the housing such that, in the installed position and at least in the state in which the sealing element is acted on with system pressure, the planar sealing surface bears against the sealing element for sealing purposes.

14. The device according to claim 13, wherein, in an installed position of the drying agent cartridge and
(a) in a first state, in which the sealing element is not acted on with a system pressure of the compressed-air treatment installation via the fluidic connection), a first axial force acts on the sealing element; and
(b) in a second state, in which the sealing element is acted on with a system pressure of the compressed-air treatment installation via the fluidic connection, a second axial force which is higher than the first axial force acts on the sealing element.

15. A utility vehicle, comprising:
a drying agent cartridge for detachable fastening to a compressed-air treatment installation of a vehicle comprising:
a cartridge housing which contains a drying agent, having a cover, which delimits the cartridge housing in an upward direction, and having a carrier element which delimits the cartridge housing in a downward direction and which, in an installed position, is detachably fastened to the housing of the compressed-air treatment installation,
a thread, which is arranged on the carrier element, for the screw connection of the drying agent cartridge to a housing, which has a corresponding counterpart thread, of a compressed-air treatment installation,
a seal groove which is arranged on the underside of the carrier element,
a sealing element which is arranged in the seal groove, and
a fluidic connection between the seal groove and a pressurizable chamber within the drying agent cartridge, via which fluidic connection the sealing element can be acted on, when the drying agent cartridge is in an installed position, with a system pressure of the compressed-air treatment installation.

* * * * *